United States Patent
Binek et al.

(10) Patent No.: US 11,846,421 B2
(45) Date of Patent: Dec. 19, 2023

(54) INTEGRATED FUEL SWIRLERS

(71) Applicant: Raytheon Technologies Corporation, Farmington, CT (US)

(72) Inventors: Lawrence A. Binek, Glastonbury, CT (US); Timothy S. Snyder, Glastonbury, CT (US); Jesse R. Boyer, Middletown, CT (US)

(73) Assignee: RTX CORPORATION, Farmington, CT (US)

( * ) Notice: Subject to any disclaimer, the term of this patent is extended or adjusted under 35 U.S.C. 154(b) by 148 days.

(21) Appl. No.: 16/791,487

(22) Filed: Feb. 14, 2020

(65) Prior Publication Data
US 2021/0254832 A1    Aug. 19, 2021

(51) Int. Cl.
| | |
|---|---|
| F23R 3/28 | (2006.01) |
| B22F 5/00 | (2006.01) |
| F02C 7/22 | (2006.01) |
| F02C 7/24 | (2006.01) |
| B33Y 80/00 | (2015.01) |

(52) U.S. Cl.
CPC .............. *F23R 3/28* (2013.01); *B22F 5/009* (2013.01); *F02C 7/222* (2013.01); *F02C 7/24* (2013.01); *B33Y 80/00* (2014.12); *F05D 2230/22* (2013.01); *F05D 2240/35* (2013.01); *F05D 2260/231* (2013.01); *F23R 2900/00018* (2013.01)

(58) Field of Classification Search
CPC .... F23R 3/14; F23R 3/28; F23R 3/286; F23R 3/346; F23R 2900/00018; B22F 5/009; F02C 7/222; F02C 7/24; B33Y 80/00; F05D 2230/22; F05D 2240/35; F05D 2260/231

See application file for complete search history.

(56) References Cited

U.S. PATENT DOCUMENTS

| | | | | |
|---|---|---|---|---|
| 3,703,259 | A | * | 11/1972 | Sturgess .................. F23D 11/10 239/404 |
| 3,853,273 | A | * | 12/1974 | Bahr ........................ F23R 3/14 239/404 |
| 9,062,609 | B2 | | 6/2015 | Mehring et al. |
| 9,803,498 | B2 | | 10/2017 | Jewess et al. |
| 2013/0174559 | A1 | | 7/2013 | Mehring et al. |
| 2013/0239575 | A1 | * | 9/2013 | Chen ........................ F23R 3/286 60/747 |
| 2014/0190170 | A1 | | 7/2014 | Cai et al. |
| 2015/0285504 | A1 | * | 10/2015 | Melton ................ B23K 26/702 60/737 |
| 2018/0058226 | A1 | | 3/2018 | Tucker et al. |
| 2018/0304281 | A1 | * | 10/2018 | Wirtz ........................ F23R 3/12 |
| 2020/0049349 | A1 | * | 2/2020 | Amble .................... F23R 3/007 |

FOREIGN PATENT DOCUMENTS

| | | |
|---|---|---|
| EP | 2639508 A2 | 9/2013 |
| EP | 3249301 A1 | 11/2017 |

OTHER PUBLICATIONS

Extended European Search Report for EP Application No. 21156880.3, dated Jul. 8, 2021, 7 pages.

* cited by examiner

*Primary Examiner* — Loren C Edwards
(74) *Attorney, Agent, or Firm* — GETZ BALICH LLC

(57) ABSTRACT

A combustor for a gas turbine engine includes a combustor liner, a fuel swirler integral and conformal with the combustor liner to provide an outlet for fuel into the combustor, and a dilution chute surrounding the fuel swirler outlet and extending into the combustor to provide a wetting surface for fuel exiting the fuel swirler.

20 Claims, 3 Drawing Sheets

INTEGRATED FUEL SWIRLERS

BACKGROUND

The present disclosure relates generally to aircraft engines. More specifically, this disclosure relates to integrated fuel swirlers of an aircraft engine.

Some aircraft can include, for example, Unpiloted (or Unmanned) Aerial Vehicles (UAVs) and expendable turbojet systems for guided munitions, missiles, and decoys. These attritable aircraft are generally designed as limited lifetime vehicles, with expected lifetimes as short as a single use or single mission vehicle. As such, many components and features common in traditional piloted aircraft are unnecessary or can be simplified for attritable aircraft applications, including fuel swirler systems.

Conventional fuel delivery systems including fuel swirlers for gas turbine engines in aircraft, both of the attritable and non-attritable type, can have many individual parts, each requiring assembly, which can be expensive and time consuming. Furthermore, cross drilling through the engine support structures has conventionally been used in order to create necessary fluid passageways, which adds additional labor and expense to the manufacturing process.

Proper combustion efficiency is essential for a gas turbine engine. Improper combustion efficiency can lead to the engine running too rich or too lean. On the one hand, a gas turbine engine running too rich can result in an engine producing low power due to incomplete combustion of the fuel, producing an engine surge or stall condition, and/or producing excessive carbon build up in the combustor. On the other hand, a gas turbine running too lean can lead to engine blow out due to insufficient fuel to sustain combustion.

SUMMARY

A combustor for a gas turbine engine includes a combustor liner, a fuel swirler integral and conformal with the combustor liner to provide an outlet for fuel into the combustor, and a dilution chute surrounding the fuel swirler outlet and extending into the combustor to provide a wetting surface for fuel exiting the fuel swirler.

A method of manufacturing a combustor with an integral and conformal fuel swirler includes additively manufacturing a combustor liner with an integral and conformal fuel swirler to provide an outlet for fuel into the combustor and additively manufacturing a dilution chute surrounding the fuel swirler outlet and extending into the combustor to provide a wetting surface for fuel exiting the fuel swirler.

DETAILED DESCRIPTION

A gas turbine engine with an integrally built fuel swirler simplifies manufacturing. A gas turbine engine can leverage additive manufacturing techniques to improve various aspects of the gas turbine engine. For example, additive manufacturing allows assembly details to be unitized, and simultaneously permits integration of many complex performance-enhancing features. The additive manufacture of the engine reduces the time to delivery to the customer and lowers the overall production costs of the unit.

Disclosed herein is a combustor with an integrally and conformally built fuel swirler to improve the combustion efficiency of fuel in the combustor of a gas turbine engine. In contrast, a combustor without a fuel swirler burns fuel inefficiently compared to a combustor with a fuel swirler, which can result in carbon build up in the combustor. Carbon build up can interfere with the air flow in the combustor reducing the combustion efficiency even more. Furthermore, localized carbon build up can result in the carbon deposits breaking free and damaging engine components downstream of the combustor.

An integral and conformal fuel swirler with an insulation channel can also help to cool the fuel line leading to the combustor. If the fuel line gets too hot, coking can occur in the fuel line, which will restrict the flow of fuel through the fuel line. Cooling the fuel line reduces the amount of coke formed in the fuel line compared to a gas turbine engine that does not have a fuel swirler with an insulation channel.

Figure 1:
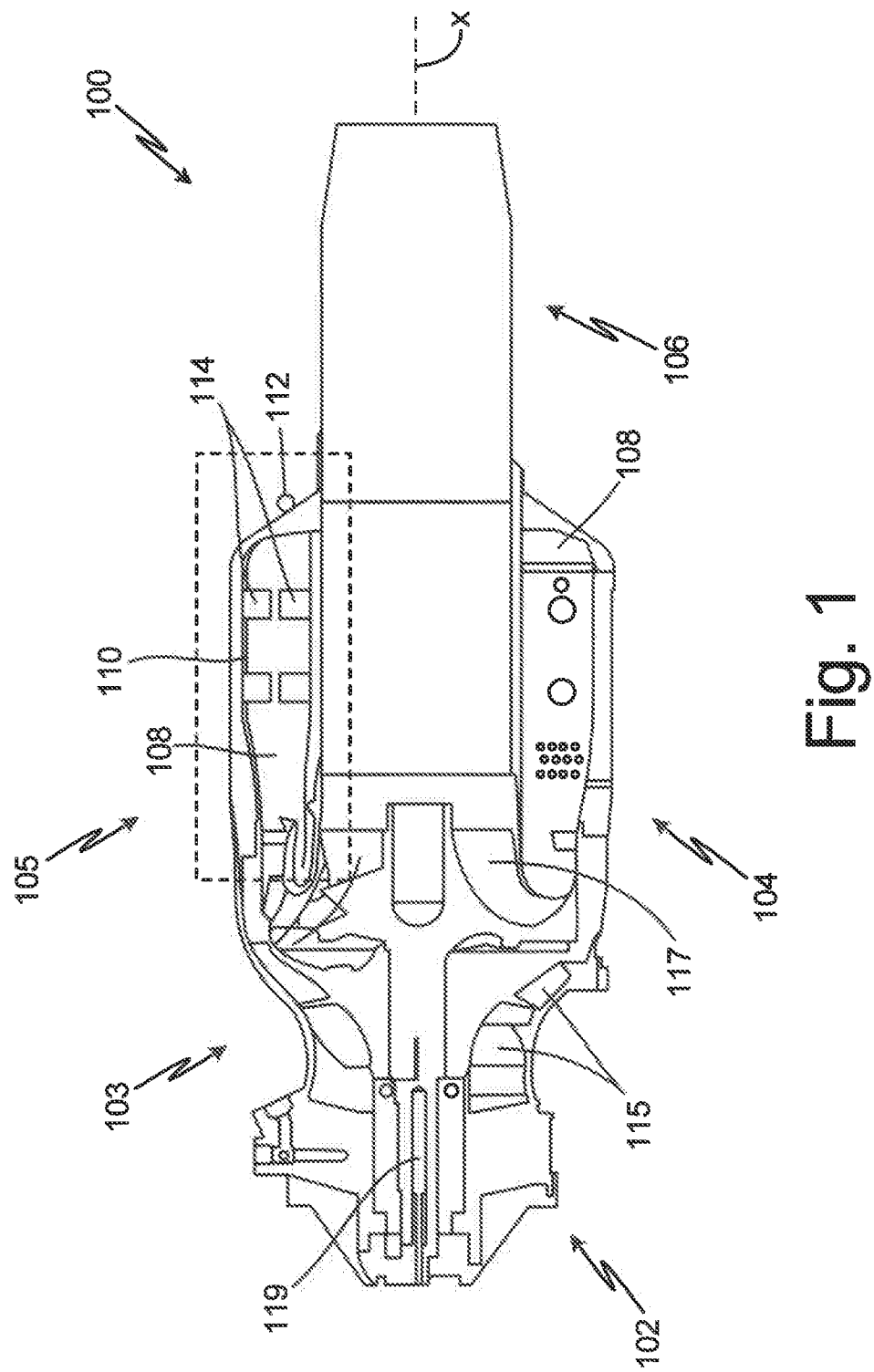
FIG. 1 is a cross-sectional view of a gas turbine engine.

FIG. 1 is a cross-sectional view of a gas turbine engine. FIG. 1 shows gas turbine engine 100 including forward engine casing 102, rearward engine casing 104, exhaust casing 106, combustor 108, combustor liner 110, fuel rail 112, dilution chutes 114, compressor blades 115, turbine blades 117, rotor 119, and rotational axis X. Forward engine casing 102 encases a compressor section of gas turbine engine 100 and is connected to rearward engine casing 104, which encases combustion and turbine sections of gas turbine engine 100. Exhaust casing 106 is connected to rearward engine casing 104, opposing forward engine casing 102.

Rearward engine casing 104 includes at least one combustor 108 with combustor liner 110, fuel rail 112, and dilution chutes 114. Fuel rail 112 circumferentially surrounds rearward engine casing 104 and receives fuel from a fuel source such as a fuel tank. Fuel rail 112 delivers fuel to each combustor 108 through dilution chute 114, which is formed integral and conformal with combustor liner 110. Although two combustors 108 are depicted in FIG. 1, gas turbine engine 100 can include a single combustor or can include more than two combustors arranged circumferentially around rotational axis X.

Operationally, air enters the forward end of a compressor section 103 encased by forward engine casing 102 and is compressed by compressor blades 115. Compressed air along with fuel enters combustor 108 through dilution chutes 114 where the compressed air and fuel are combusted. The combusted fuel and compressed air from combustor 108 enter a turbine section 105 encased by rearward engine casing 104 and turns turbine blades 117 circumferentially around rotational axis X, which generates power by also turning rotor 119 connected to compressor blades 115. The air exits out of the aft end of exhaust casing 106.

Figure 2:
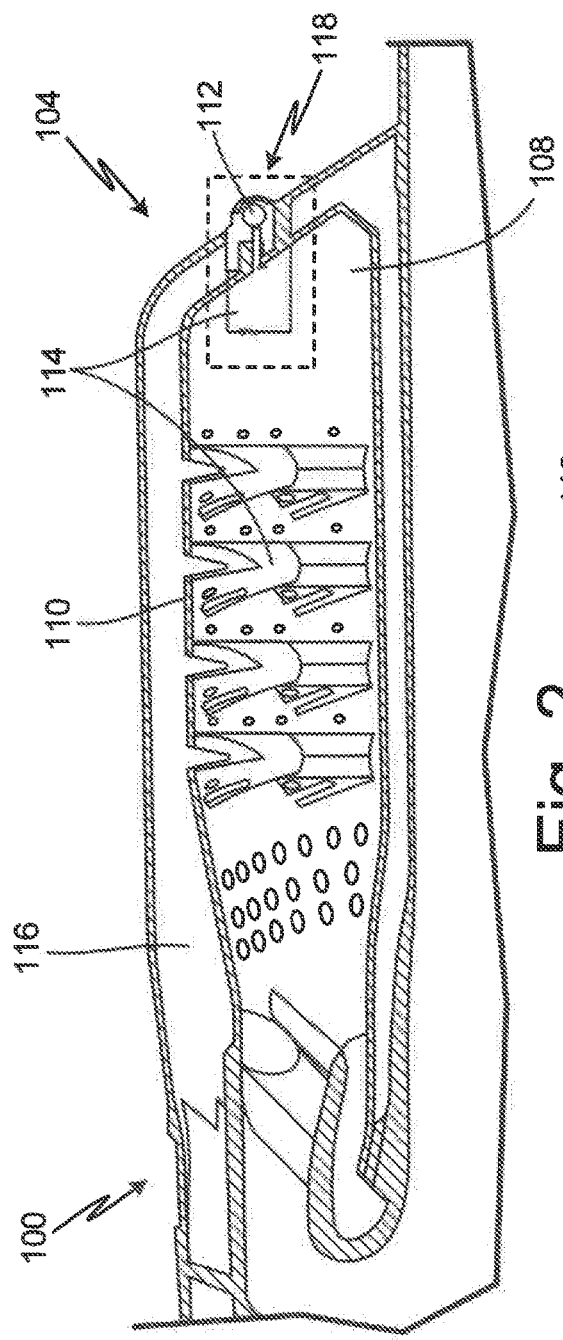
FIG. 2 is a sectional view from FIG. 1 showing a combustor.

FIG. 2 is a sectional view from FIG. 1 showing a combustor. FIG. 2 shows gas turbine engine 100 including rearward engine casing 104, at least one combustor 108, combustor liner 110, fuel rail 112, dilution chutes 114, compressed air channel 116, and fuel swirler 118. Rearward engine casing 104 includes combustor 108 with combustor liner 110, fuel rail 112, and dilution chutes 114. Fuel rail 110 circumferentially surrounds rearward engine casing 104 and receives fuel from a fuel source such as a fuel tank. Fuel rail 112 delivers fuel to each combustor 108 through dilution chute 114, which is formed integral and conformal with combustor liner 110. In the context of this application, integral means "formed as a unitary part" and conformal means "substantially following the geometry of."

Compressed air channel 116 surrounds combustor 108. Compressed air is received from the compressor section 103 and enters combustor 108 through a series of dilution holes and dilution chutes 114. Compressed air also enters combustor 108 through fuel swirler 118. In one embodiment, combustor 108 includes more than one dilution chute as shown in FIGS. 1 and 2. The combustor may include more than one type of dilution chute. For example, the combustor may include primary dilution chutes for allowing atomized fuel and air to enter the combustor and the combustor may also include secondary dilution chutes for allowing additional air to enter the combustor. In the illustrated embodiments in FIGS. 1 and 2, each combustor 108 in attritable engine 100 includes twelve primary and twelve secondary dilution chutes with each set being circumferentially arranged around combustor liner 110. The placement, number, and orientation of the dilution chutes can be optimized for fuel efficiency. Factors which may influence fuel efficiency parameters are, for example, engine size, engine load and/or demand requirements, materials used in the build process, and engine cooling requirements.

In other embodiments, a fewer or greater number of primary or secondary dilution chutes are integral and conformal with combustor liner 110. In one embodiment, each fuel swirler 118 is used with each primary dilution chute to introduce fuel into combustor 108. In other embodiments, each fuel swirler 118 is used with a subset of the primary dilution chutes to introduce fuel into combustor 108.

Figure 3:
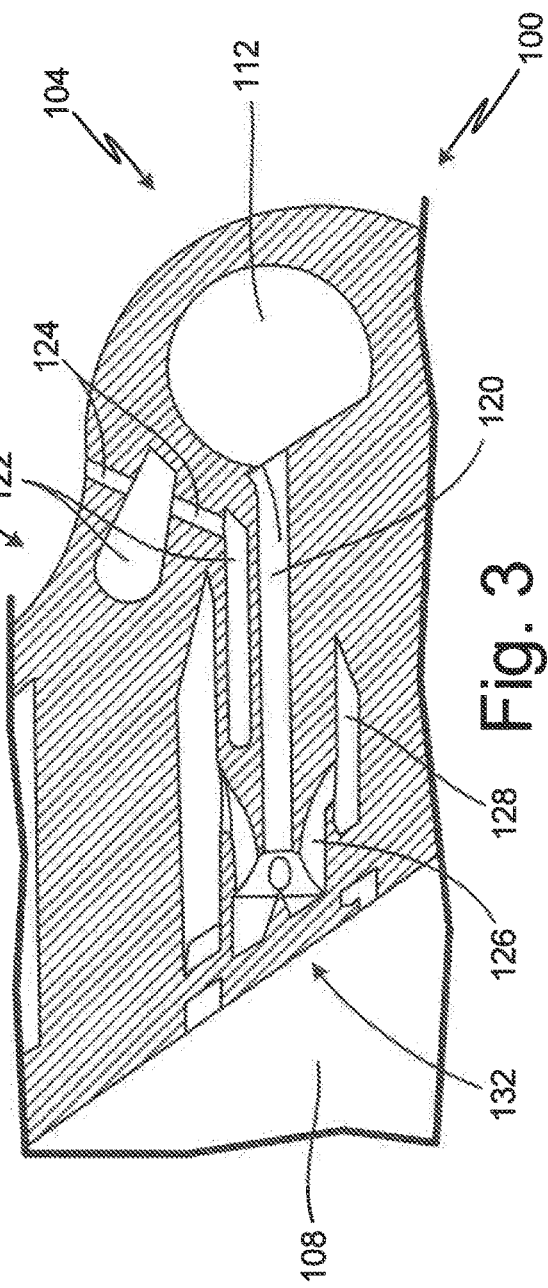
FIG. 3 is a sectional view from FIG. 2 showing one embodiment of a fuel swirler.

FIG. 3 is a sectional view from FIG. 2 showing one embodiment of a fuel swirler. FIG. 3 shows gas turbine engine 100 including combustor 108, fuel rail 112, fuel swirler 118, fuel line 120, insulation channels 122, powder extraction channels 124, primary air flow channels 126, and secondary air flow channels 128. Fuel swirler 118 receives fuel from fuel rail 112 and delivers the fuel to combustor 108. Fuel swirler 118 includes fuel line 120, which is in fluid communication with fuel rail 112 and combustor 108. Fuel line 120 can include insulation channels 122, which can substantially surround fuel line 120 or partially surround fuel line 120. During operation, combustor 108 can heat nearby structures such as, for example, fuel line 120. Excessive heat to fuel line 120 can cause coking of the fuel to occur. Coke deposits in a fuel line can restrict the flow of fuel, reducing the overall power output of the engine. Under extreme conditions or prolonged exposure to heat, coking can completely plug the fuel line and cause the engine to fail.

Insulation channels 122 can contain air, which conducts heat much more slowly than a continuous metallic structure. As such, fuel line 120 is exposed to lower temperatures during operation, reducing coke formation in fuel line 120, compared to a fuel swirler without insulation channels. Powder extraction channels 124 extend from the exterior of rearward engine casing 104 into insulation channels 122 and assist removal of any unsintered powder present in insulation channels 122. For example, during the additive manufacturing process metallic powder is selectively sintered to form a desired part. After additively manufacturing gas turbine engine 100, unsintered powder can be removed from, for example, insulation channels 122 through powder extraction channels 124 using gravity and vibrating the part. After powder removal, powder extraction channels 124 can remain open to allow fluid communication with ambient air during engine operation or can be plugged during engine operation to prevent fluid communication with ambient air.

Fuel swirler 118 can include primary air flow channels 126, which receive compressed air from a compressed air channel. Primary air flow channels 126 are adjacent to and circumferentially surround outlet 132 of fuel line 120. Fuel swirler 118 can also include secondary air flow channels 128, which receive compressed air from a compressed air channel. Secondary air flow channels 128 are adjacent to and circumferentially surround primary air flow channels 126. Primary and secondary air flow channels 126, 128 improve atomization of the fuel and mixing with compressed air, which increases combustion efficiency of the fuel in combustor 108 compared to a fuel line without primary or secondary air flow channels. The increase in combustion efficiency of the fuel results in decreased carbon deposit formation in the combustor.

Gas turbine engine 100 including combustor 108, combustor liner 110, fuel rail 112, dilution chutes 114, compressed air channel 116, and fuel swirler 118 can be additively manufactured using any metal or alloy that can tolerate the high temperature and pressure environment of a gas turbine engine for the expected useable life of the vehicle, such as, for example, Inconel® 625 or other nickel alloys including alloys of nickel, chromium, and iron. However, guided munitions, missiles, and decoys are designed as single use vehicles and can have a maximum useable life of 10 hours. Heat protection that extends the useable life of the vehicle beyond 10 hours can unnecessarily add labor and expense to the manufacturing of such an engine. On the other hand, some UAVs can be designed to perform multiple missions and more heat protection may be desirable. A specific metal or alloy with or without additional treatments to provide heat protection can be chosen with such considerations in mind. For example, a thermal barrier layer or coating can be applied to the metal or alloy to extend the useful life of the gas turbine engine.

Figure 4:
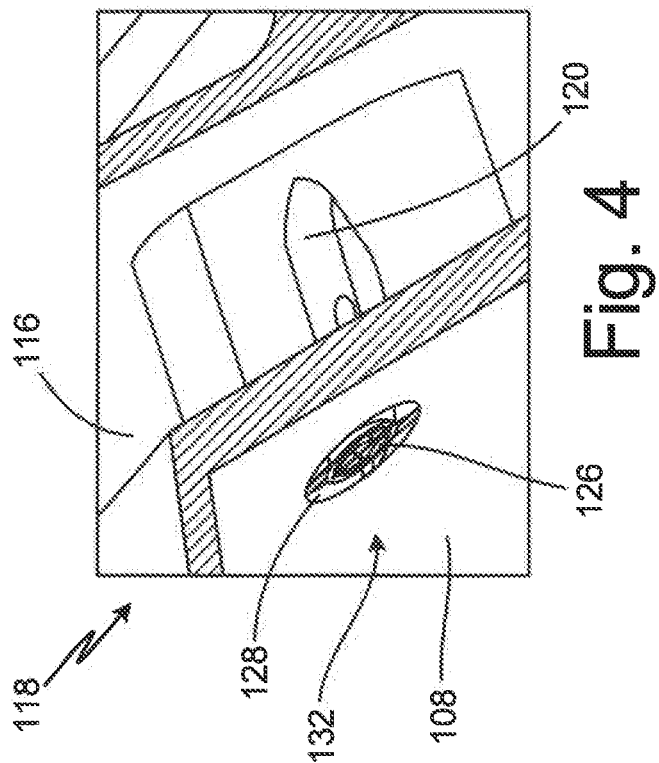
FIG. 4 is a perspective view of the fuel swirler.

FIG. 4 is a perspective view of one embodiment of the fuel swirler. FIG. 4 shows combustor 108, compressed air channel 116, fuel swirler 118, fuel line 120, primary air flow channels 126, and secondary air flow channels 128. Combustor 108 receives compressed air and fuel from fuel swirler 118. Compressed air travels through compressed air channel 116 and delivers compressed air into primary and secondary air flow channels 126, 128 of fuel swirler 118. Fuel travels through fuel line 120 and mixes with the compressed air as the fuel exits fuel line 120 at outlet 132. The mixed fuel is atomized and mixed with compressed air and delivered into a dilution chute (not shown in FIG. 4).

Figure 5:
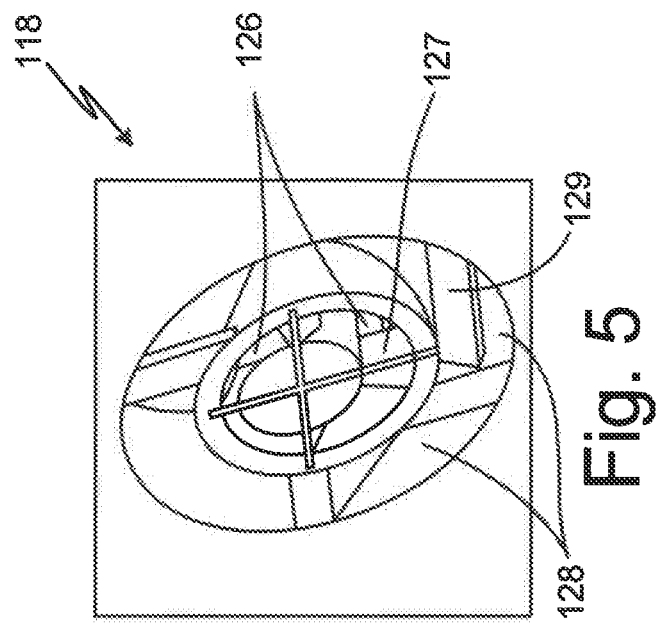
FIG. 5 is another perspective view of the fuel swirler.

FIG. 5 is another perspective view of one embodiment of the fuel swirler. FIG. 5 shows fuel swirler 118, primary air flow channels 126, vanes 127, secondary air flow channels 128, and vanes 129. The combustor receives compressed air and fuel from fuel swirler 118. Compressed air travels through the compressed air channel and delivers compressed air into primary and secondary air flow channels 126, 128 of fuel swirler 118. Fuel travels through the fuel line and mixes with the compressed air as the fuel exits the fuel line at the outlet. The mixed fuel is atomized and mixed with compressed air and delivered into a dilution chute.

Compressed air passing through primary air flow channels 126 and secondary air flow channels 128 is turned by vanes 127 and vanes 129, respectively. Vanes 127 and 129 impart a rotational component to the compressed air, which increases the atomization of the fuel and the overall combustion efficiency of the fuel. As depicted in FIG. 5 primary air flow channels 126 and secondary air flow channels 128 each include four vanes 127 and 129, respectively. In some embodiments, primary and secondary air flow channels 126 and 128 have fewer vanes than four each. In some embodiments, primary and secondary air flow channels 126 and 128 have more vanes than four each. The number, size, and shape of the primary and secondary air flow channels and the number, size, and shape of the vanes placed within the primary and secondary air flow channels are configured to increase overall combustion efficiency and provide sufficient air flow such that the combustor components do not over heat.

A combustor without a fuel swirler burns fuel inefficiently compared to a combustor with a fuel swirler, which can result in carbon build up in the combustor. Notably, carbon build up can alter the air flow characteristics in the combustor, reducing the combustion efficiency even more. Furthermore, carbon build up can result in flaking, peeling, or breaking-off of the carbon deposits during engine operation. Large carbon deposits may damage internal downstream components as the carbon deposits travel through the engine.

Using additive manufacturing techniques such as, for example, laser powder bed fusion, electron beam melting, and glue binder jetting, a gas turbine engine can be built with an integral and conformable fuel swirler as disclosed in the present application, which simplifies the manufacturing and assembly process, lowering overall production costs. The fuel swirler disclosed in the present application increases combustion efficiency and reduces the amount of carbon deposition in the combustor during engine operation compared to a gas turbine engine without a fuel swirler.

Discussion of Possible Embodiments

The following are non-exclusive descriptions of possible embodiments of the present invention.

A combustor for a gas turbine engine includes a combustor liner, a fuel swirler integral and conformal with the combustor liner to provide an outlet for fuel into the combustor, and a dilution chute surrounding the fuel swirler outlet and extending into the combustor to provide a wetting surface for fuel exiting the fuel swirler.

The combustor of the preceding paragraph can optionally include, additionally and/or alternatively, any one or more of the following features, configurations and/or additional components:

The fuel swirler includes a fuel line in fluid communication with the fuel swirler outlet.

The fuel swirler includes an insulation channel circumscribing the fuel line to reduce heat buildup within the fuel line.

The insulation channel is additively manufactured by selected sintering of powder and the insulation channel includes a powder extraction channel to remove unsintered powder from the insulation channel.

The fuel swirler includes a primary air channel circumscribing the fuel line.

The primary air channel includes vanes for directing the airflow and the vanes are adjacent to the fuel swirler outlet.

The fuel swirler includes a secondary air channel circumscribing the primary air channel.

The secondary air channel includes vanes for directing the airflow and the vanes are adjacent to the fuel swirler outlet.

A method of manufacturing a combustor with an integral and conformal fuel swirler includes additively manufacturing a combustor liner with an integral and conformal fuel swirler to provide an outlet for fuel into the combustor and additively manufacturing a dilution chute surrounding the fuel swirler outlet and extending into the combustor to provide a wetting surface for fuel exiting the fuel swirler.

The method of the preceding paragraph can optionally include, additionally and/or alternatively, any one or more of the following features, configurations and/or additional components:

Additively manufacturing the combustor liner with the integral and conformal fuel swirler includes additively manufacturing a fuel line in fluid communication with the fuel swirler outlet.

Additively manufacturing the combustor liner with the integral and conformal fuel swirler includes additively manufacturing an insulation channel circumscribing the fuel line to reduce heat buildup within the fuel line.

Additively manufacturing the combustor liner with the integral and conformal fuel swirler includes additively manufacturing a powder extraction channel to remove unsintered powder from the insulation channel.

Additively manufacturing a powder extraction channel to remove unsintered powder from the insulation channel includes removing unsintered powder from the insulation channel.

Additively manufacturing the combustor liner with the integral and conformal fuel swirler includes additively manufacturing a primary air channel surrounding the fuel channel.

The primary air channel includes vanes for directing the airflow.

Additively manufacturing the combustor liner with the integral and conformal fuel swirler includes additively manufacturing a secondary air channel surrounding the primary air channel.

The secondary air channel includes vanes for directing the airflow.

The method includes providing a metallic powder that can be sintered to form the combustor.

The method includes sintering the metallic powder to form the combustor.

A gas turbine engine includes a compressor section and a combustor section in fluid communication with the compressor section. The combustor section includes a combustor liner and a fuel swirler integral and conformal with the combustor liner to provide an outlet for fuel into the combustor. The fuel swirler includes a fuel line, an additively manufactured insulation channel by selected sintering of powder and the insulation channel circumscribes the fuel line to reduce heat buildup within the fuel line, and a powder extraction channel to remove unsintered powder from the insulation channel. The fuel swirler includes a primary air channel circumscribing the fuel line with vanes for directing airflow and the vanes are adjacent to the fuel swirler outlet and a secondary air channel circumscribing the primary air channel with vanes for directing airflow and the vanes are adjacent to the fuel swirler outlet. The combustor section includes a dilution chute surrounding the fuel swirler outlet and extending into the combustor to provide a wetting surface for fuel exiting the fuel swirler. The gas turbine engine includes a turbine section in fluid communication with the combustor section and an exhaust section in fluid communication with the turbine section.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A combustor for a gas turbine engine, the combustor comprising:
   a combustor liner integral and within an engine casing;
   a fuel swirler integral and conformal with the combustor liner to provide an outlet a fuel swirler outlet for fuel into the combustor; and
   a dilution chute surrounding the fuel swirler outlet and extending into the combustor to provide a wetting surface for fuel exiting the fuel swirler;
   the fuel swirler comprising a fuel line and a primary air channel, the fuel line in fluid communication with the fuel swirler outlet, the fuel line integral with the combustor liner, and the primary air channel circumferentially surrounding the fuel line.

2. The combustor of claim 1, wherein
   the fuel swirler comprises an insulation channel circumscribing the fuel line to reduce heat buildup within the fuel line, and
   the insulation channel contains air.

3. The combustor of claim 2, wherein the insulation channel is additively manufactured by selected sintering of powder and the insulation channel comprises a powder extraction channel to remove unsintered powder from the insulation channel.

4. The combustor of claim 2, wherein
   the fuel swirler further comprises a secondary air channel circumscribing the primary air channel; and
   the insulation channel is arranged between and longitudinally overlaps the secondary air channel and the fuel line.

5. The combustor of claim 2, wherein an interior of the insulation channel is open to ambient air.

6. The combustor of claim 1, wherein the primary air channel includes a plurality of vanes for directing an airflow, and the vanes are adjacent to the fuel swirler outlet.

7. The combustor of claim 1, wherein the fuel swirler comprises a secondary air channel circumscribing the primary air channel.

8. The combustor of claim 7, wherein the secondary air channel includes a plurality of vanes for directing an airflow, and the vanes are adjacent to the fuel swirler outlet.

9. The combustor of claim 7, wherein the primary air channel is fluidly coupled with and extends from the secondary air channel.

10. A method of manufacturing a combustor, the method comprising:
    additively manufacturing a combustor liner with an integral and conformal fuel swirler, the combustor liner integral and within an engine casing, the integral and conformal fuel swirler including a fuel line and a primary air channel circumferentially surrounding the fuel line, the integral and conformal fuel swirler configured to provide a fuel swirler outlet for fuel into the combustor, and the fuel line in fluid communication with the fuel swirler outlet, wherein the fuel line is integral with the combustor liner; and
    additively manufacturing a dilution chute surrounding the fuel swirler outlet and extending into the combustor to provide a wetting surface for fuel exiting the fuel swirler.

11. The method of claim 10, wherein the additively manufacturing the combustor liner with the integral and conformal fuel swirler further comprises additively manufacturing an insulation channel circumscribing the fuel line to reduce heat buildup within the fuel line.

12. The method of claim 11, wherein the additively manufacturing the combustor liner with the integral and conformal fuel swirler further comprises additively manufacturing a powder extraction channel to remove an unsintered powder from the insulation channel.

13. The method of claim 12, further comprising removing the unsintered powder from the insulation channel through the powder extraction channel.

14. The method of claim 10, wherein the primary air channel includes a plurality of vanes for directing an airflow.

15. The method of claim 10, wherein the additively manufacturing the combustor liner with the integral and conformal fuel swirler further comprises additively manufacturing a secondary air channel extending around the primary air channel.

16. The method of claim 15, wherein the secondary air channel includes a plurality of vanes for directing an airflow.

17. The method of claim 10, further comprising sintering a metallic powder to form the combustor.

18. A gas turbine engine comprising:
    a compressor section;
    a combustor section in fluid communication with the compressor section, the combustor section comprising:
      a combustor liner integral and within an engine casing;
      a fuel swirler integral and conformal with the combustor liner to provide an outlet a fuel swirler outlet for fuel into the combustor section, the fuel swirler comprising:
        a fuel line integral with the combustor liner;
        an additively manufactured insulation channel by selected sintering of powder, wherein the insulation channel circumscribes the fuel line to reduce heat buildup within the fuel line;
        a powder extraction channel to remove unsintered powder from the insulation channel;
        a primary air channel circumferentially surrounding the fuel line with a plurality of first vanes for directing airflow, wherein the plurality of first vanes are adjacent to the fuel swirler outlet; and
        a secondary air channel circumferentially surrounding the primary air channel with a plurality of second vanes for directing airflow, wherein the plurality of second vanes are adjacent to the fuel swirler outlet; and
      a dilution chute surrounding the fuel swirler outlet and extending into the combustor section to provide a wetting surface for fuel exiting the fuel swirler;
    a turbine section in fluid communication with the combustor section; and
    an exhaust section in fluid communication with the turbine section.

19. The gas turbine engine of claim 18, wherein the insulation channel is arranged between and longitudinally overlaps the secondary air channel and the fuel line.

20. The gas turbine engine of claim 18, wherein the insulation channel contains air.

* * * * *